United States Patent
Mori et al.

(10) Patent No.: US 6,559,227 B1
(45) Date of Patent: May 6, 2003

(54) PROCESS FOR PRODUCING VINYLAMINE-VINYL ALCOHOL COPOLYMER AND USE OF THE COPOLYMER

(75) Inventors: Yasuharu Mori, Kanagawa (JP); Kohichi Satoh, Kanagawa (JP); Nobuhiko Ueno, Kanagawa (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 09/628,325

(22) Filed: Jul. 28, 2000

(51) Int. Cl.⁷ .................. C08F 8/12; C08F 16/06; C08F 216/06

(52) U.S. Cl. .................. 525/60; 525/367; 525/369; 525/328.2

(58) Field of Search ............... 525/60, 328.2, 525/367, 369

(56) References Cited

U.S. PATENT DOCUMENTS

| | | | |
|---|---|---|---|
| 4,645,794 A | * 2/1987 | Davis et al. ............... 525/61 |
| 4,713,236 A | 12/1987 | Hoover et al. | |
| 4,774,285 A | 9/1988 | Pfohl et al. | |
| 4,818,788 A | * 4/1989 | Sato et al. ............... 525/62 |
| 4,880,497 A | 11/1989 | Pfohl et al. | |
| 4,978,427 A | 12/1990 | Pfohl et al. | |
| 5,155,167 A | 10/1992 | Pinschmidt, Jr. et al. | |
| 5,194,492 A | * 3/1993 | Pinschmidt, Jr. et al. ..... 525/60 |
| 5,609,857 A | 3/1997 | Chandran et al. | |

FOREIGN PATENT DOCUMENTS

| | | |
|---|---|---|
| DE | 40 34 543 | 5/1991 |
| EP | 0 216 387 | 4/1987 |
| EP | 0 339 371 | 11/1989 |
| JP | 9-087144 | 3/1997 |
| JP | 9-087151 | 3/1997 |

* cited by examiner

Primary Examiner—D. R. Wilson
(74) Attorney, Agent, or Firm—Oblon, Spivak, McClelland, Maier & Neustadt, P.C.

(57) ABSTRACT

Disclosed is a process for producing a powdered water-soluble polymer comprising hydrolyzing a copolymer comprising an N-vinylamide unit and a vinyl acetate unit while dispersed in water under a basic condition and then washing the resulting powdered water-soluble polymer with at least one washing liquid selected from an alcohol, water at 20° C. or lower, and salt water.

12 Claims, No Drawings

PROCESS FOR PRODUCING VINYLAMINE-VINYL ALCOHOL COPOLYMER AND USE OF THE COPOLYMER

FIELD OF THE INVENTION

This invention relates to a process for producing a vinylamine-vinyl alcohol copolymer, more particularly, a process for easily obtaining the copolymer in the form of powder, and uses of the copolymer as a hair setting composition or a hair conditioning composition.

BACKGROUND OF THE INVENTION

Vinylamine-vinyl alcohol copolymers are known to have various functions. For example, JP-A-62-74902 (the term "JP-A" as used herein means an "unexamined published Japanese patent application") describes the function as a chemical to be used in papermaking. U.S. Pat. No. 4,713,236 teaches application to hair care products including shampoos. JP-A-9-87144 discloses use in a hair conditioning composition. JP-A-9-87151 proposes use in hair styling cosmetics.

Although N-vinylformamide, which is a starting material of the vinylamine-vinyl alcohol copolymer, has recently come to be available in industry, the vinylamine-vinyl alcohol copolymer itself is not manufactured on an industrial scale for the time being because an economical process of production has not been established as yet.

Processes of producing the copolymer that have hitherto been reported include a process comprising acid-hydrolysis of an N-vinylformamide-vinyl acetate copolymer in water (see JP-A-62-74902) and a process comprising polymerizing N-vinylformamide and vinyl acetate in an alcohol followed by hydrolysis (see JP-B-6-51741; the term "JP-B" as used herein means an "examined Japanese patent publication"). The former process yields the polymer in the form of an aqueous solution, which is inconvenient in transportation or purification. The latter process has an advantage of easy purification because the polymer is obtained in the form of powder but is disadvantageous in that, for one thing, a large quantity of an alcohol is required, which leads to an increase of cost, and, for another, complicated production steps are involved.

SUMMARY OF THE INVENTION

The present invention has been completed in the light of the above-described circumstances. An object of the present invention is to provide a vinylamine-vinyl alcohol copolymer in a powdered form at a low cost.

As a result of extensive studies, the present inventors have found that the vinylamine-vinyl alcohol copolymer precipitates in a powdered form where a copolymer comprising an N-vinylamide unit and a vinyl acetate unit as dispersed in water is hydrolyzed under a basic condition. Where the N-vinylamide-vinyl acetate copolymer is hydrolyzed in water in an acidic condition as in the known process, the vinylamine unit of the hydrolysate takes the form of a salt (e.g., a hydrochloride) so that the resulting polymer dissolves in water. On the other hand, where the hydrolysis is conducted under a basic condition according to the invention, the vinylamine unit takes the form of a free amine, and the desired polymer is salted out by the influence of hydrolysis by-produced salts such as sodium acetate and sodium formate.

The polymer obtained by hydrolysis under a basic condition unavoidably contains by-produced salts, such as sodium acetate and sodium formate. Washing with water is a conceivable method for removing these salts. However, the polymer, being water-soluble, will be dissolved when merely washed with water, resulting in a considerable washing loss, which eventually leads to an increase of the polymer price.

The present inventors have continued their study to settle the above problem of washing loss and, as a result, found a specific means for washing the hydrolysis reaction mixture which is obtained by hydrolyzing a copolymer comprising an N-vinylamide unit and a vinyl acetate unit under a basic condition to remove only the impurities without being accompanied by dissolution of the desired polymer.

The gist of the present invention consists in a process for producing a powdered water-soluble polymer comprising hydrolyzing a copolymer comprising an N-vinylamide unit and a vinyl acetate unit while dispersed in water under a basic condition and then washing the resulting powdered water-soluble polymer with at least one washing liquid selected from an alcohol, water at 20° C. or lower, and salt water.

DETAILED DESCRIPTION OF THE INVENTION

The polymer which can be used in the invention as a starting material is a copolymer mainly comprising an N-vinylamide unit and a vinyl acetate unit. The monomer providing the N-vinylamide unit includes N-vinylformamide and N-vinylacetamide, with N-vinylformamide being preferred. The starting copolymer usually comprises about 1 to 50 mol % of the N-vinylamide unit and about 50 to 99 mol % of the vinyl acetate unit.

The molar ratio of the N-vinylamide unit and the vinyl acetate unit in the copolymer usually ranges from 1:99 to 50:50, preferably 5:95 to 50:50. Where the N-vinylamide unit content is too high, the hydrolyzed polymer tends to dissolve.

The starting copolymer may further comprise other arbitrary monomer units as long as the desired characteristics of the resulting polymer are not impaired. The content of the other monomer units, while varying depending on the monomer, is usually 30 mol % or less based on the total monomer units.

The N-vinylamide-vinyl acetate copolymer can be prepared by known techniques such as emulsion polymerization or suspension polymerization in water. Emulsion polymerization is recommended for ease in handling the resulting polymer. Polymerization is carried out by radical polymerization preferably in the presence of an azo initiator. The monomer concentration in the polymerization system is usually 1 to 50% by weight, preferably 10 to 45% by weight. If desired, assistants, such as an emulsifying agent used in emulsion polymerization or a chain transfer agent as a molecular weight modifier, can be used. The reaction mixture as obtained by emulsion polymerization or suspension polymerization is a white emulsion or a slurry, respectively.

The polymerization is followed by hydrolysis. The polymerization reaction mixture (e.g., an emulsion or a slurry) can be subjected to hydrolysis as such or, if desired, with the polymer concentration in water adjusted by dilution with water or concentration by, for example, evaporation of water. The concentration of the polymer to be hydrolyzed is usually in the range of 1 to 50% by weight, preferably 10 to 45% by weight. If the polymer concentration is too low, the hydrolysate polymer may dissolve. Too high a polymer concentration requires much power for stirring.

The hydrolysis should be carried out under a basic condition. The basic condition is preferably such as created in the presence of a strong alkali, particularly a caustic alkali such as caustic soda or caustic potash.

The alkali is usually added in an amount of 0.1 to 10 equivalents, preferably 0.5 to 5 equivalents, per equivalent of the total monomers. It should be noted that the polymer after hydrolysis is water-soluble. It is the salt by-produced by the hydrolysis that causes the water-soluble polymer to precipitate. Therefore, where the amount of the base is small, and the degree of hydrolysis is low or where the reaction system has a low concentration or in like situations, the salt concentration may be so low that the polymer easily dissolves or swells, resulting in a filtration failure. Such a case can be managed by adding a supplementary salt to accelerate precipitation (salting-out) of the polymer. Salts which can be added include sodium acetate, potassium acetate, sodium formate, potassium formate, sodium chloride, potassium chloride, sodium sulfate, potassium sulfate, calcium chloride, sodium carbonate, and potassium carbonate. In particular, addition of a salt of a polybasic acid, such as sulfuric acid, phosphoric acid or carbonic acid, is effective in precipitating the polymer. The salt concentration in the precipitation system, i.e., the total of the salt by-produced by the hydrolysis and the supplementary salt added to accelerate salting-out, is usually 0.5 to 50% by weight, preferably 1 to 30% by weight. The supplementary salt, if needed, is preferably added after completion of the hydrolysis rather than before hydrolysis.

In order to increase the degree of hydrolysis and to prevent the hydrolysate polymer from sedimentation in lumps, it is preferred that the reaction mixture be stirred strongly during hydrolysis. The hydrolysis reaction temperature is usually about 20 to 100° C. While not limiting, the hydrolysis reaction time is usually about 10 minutes to about 10 hours. The degree of hydrolysis of the polymer is usually 10 to 100%, preferably 20 to 100%, as for both the N-vinylamide unit and the vinyl acetate unit. It is acceptable to increase the hydrolysis degree of only the vinyl acetate unit by, for example, temperature adjustment.

By the end of the hydrolysis, the reaction mixture has become a slurry, which is usually cooled and separated into solid and liquid by filtration, centrifugation, sedimentation or a like means to collect the solid matter. Since the by-produced acetate and formate are water-soluble, most of impurities other than those present in the surface water on the collected solid can be removed by the solid-liquid separation, provided that the supplementary salt or assistants to be added in the preceding steps are selected from water-soluble ones.

Subsequently the collected polymer is washed to remove the impurities incorporated into the polymer. The polymer being water-soluble, washing with water will remove the impurities but is accompanied with a considerable loss of the polymer. In the present invention, washing is effected with a washing liquid comprising at least one member selected from (1) an alcohol, (2) cold water at 20° C. or lower, and (3) salt water in order to remove the impurities in the polymer with a minimized polymer loss.

In case of using an alcohol, alcohol-soluble salts can be washed away while the polymer remains undissolved. The alcohols which can be used suitably include lower aliphatic alcohols having 1 to 4 carbon atoms, such as ethanol, methanol, and isopropyl alcohol. Washing with these lower alcohols easily achieves purification, removing such salts as sodium formate by dissolution. The merit of using an alcohol resides in the possibility that some of the emulsifying agents that may have been used in the polymerization can be washed away efficiently. The alcohol for washing is usually used at a temperature of 40° C. or lower, preferably 30° C. or lower. In using an alcohol as a washing liquid, it is preferred that the salt to be supplementarily added for salting-out in the preceding stage be selected from those having high solubility in the alcohol.

In case of using cold water as a washing liquid, water-soluble impurities can be washed off while virtually suppressing dissolution loss of the polymer. Since the solubility or the rate of dissolution of the polymer in water increases with temperature, the temperature of the washing water should be 20° C. or lower, preferably 10° C. or lower, still preferably 0 to 5° C.

Where the polymer is washed with salt water, impurities other than the salt of the salt water, such as sodium formate and sodium acetate, can be removed. Suitable salts of salt water include sodium chloride, potassium chloride, sodium sulfate, potassium sulfate, and calcium chloride.

While somewhat varying depending on the kind of the salt, the salt concentration in the salt water is usually 0.5% by weight or more, preferably 1% by weight or more, still preferably 3% by weight or more. The temperature of the salt water is usually 40° C. or lower, preferably 30° C. or lower.

The washing method using cold water or salt water is economically advantageous because no solvent other than water is used.

The washing liquid may be a mixture of two or more of the alcohol, cold water (20° C. or lower), and the salt water. For example, a mixture of an alcohol and water in a mixing ratio of 1:10 to 10:1 by volume can be used at a liquid temperature of 30° C. or lower, preferably 20° C. or lower.

Washing can be performed by sedimentation followed by decantation, filtration followed by washing and rinsing and the like. The number of washing times can be decided arbitrarily. Washing with a washing liquid of a kind (an alcohol, cold water, salt water or a mixture thereof) or a combination of two or more kinds can be repeated several times. Washing is usually conducted until the total concentration of the acetate and the formate by-produced by the hydrolysis in the polymer is reduced to 5000 ppm or less. The by-produced acetate and formate include sodium acetate, potassium acetate, sodium formate and potassium formate.

The washed polymer is dried in a conventional manner, for example, by air blowing or vacuum drying. Drying temperature is preferably 100° C. or lower, still preferably 60° C. or lower. The resulting powdered polymer, which is water-soluble, is re-dissolved in water, preferably warm water, on use. It is recommended to use warm water at 40 to 100° C.

The water-soluble polymer produced by the above-described process can be used as, for example, wet-end paper additives, dry-end paper additives, a dispersant, coatings applied to paper or a plastic film, and hair care products such as a shampoo. The polymer exhibits the respective desired functions in these uses. When used as a coating of a plastic film, etc., the polymer has a sufficiently low content of impurities and undergoes no reduction of transparency or color change. The water-soluble polymer of the invention is particularly suited as a component of hair care products, providing hair-setting compositions including hair sprays, styling gels, and styling mousses; shampoo compositions; hair conditioning compositions including hair conditioners and treating formulae for damaged hair, and the like. Form of these hair care products include a lotion, an emulsion, gel, foam, and aerosol. The hair-setting compositions comprising the water-soluble polymer of the invention have excellent and long-lasting hair-setting performance (ability to maintain hair in a desired style). The hair conditioning compositions comprising the water-soluble polymer of the invention exhibit excellent moisture retaining effects.

In addition, the water-soluble polymer of the invention can be used as a dye fixing agent, a kind of dyeing auxiliaries. It is especially effective on dye fixing of cotton fiber dyed with reactive dyes. The polymer also exhibits marked effects as an ink fixing agent which is applied to the acceptor for ink jet printing, such as paper, films, fabric, etc. In connection with dyeing of fiber, the polymer is also suitable as an assistant ink jet dyeing.

The present invention will now be illustrated in greater detail with reference to Examples, but it should be understood that the invention is not construed as being limited thereto. Unless otherwise noted, all the percents are by weight.

EXAMPLE 1 a) Synthesis of Polymer

In a 1 liter-volume 4-necked flask equipped with a stirrer, an inlet for nitrogen, and a cooling tube were put 270 g of desalted water, 6.31 g of a styrene-maleic anhydride copolymer (average molecular weight: 2600) as a dispersion stabilizer, 0.68 g of sodium pyrophosphate as a dispersion stabilizer, 2.6 g of N-vinylformamide, 17.7 g of vinyl acetate, and 0.045 g of 2,2'-azobis(2,4-dimethylvaleronitrile) (V-65, available from Wako Pure Chemical Industries, Ltd.) as a polymerization initiator, and the mixture was heated to 65° C. while stirring. When the reaction mixture began to get white turbid, a mixture of 23.42 g of N-vinylformamide, 159.07 g of vinyl acetate, and 0.405 g of V-65 was added thereto dropwise over 3 hours. After stirring at 75° C. for 2 hours, 0.09 g of N,N'-azobisisobutyronitrile and 135 g of desalted water were added thereto, followed by stirring for 3 hours. To the reaction mixture were further added 0.09 g of N,N'-azobisisobutyronitrile, and stirring was continued at 98° C. for 1 hour to give a white paste. Liquid chromatography revealed that the percent conversions of N-vinylformamide and vinyl acetate were 99.6% and 99.4%, respectively.

b) Hydrolysis

To 355 g of the white pasty polymer composition was added 1.45 g of hydroxylamine hydrochloride, followed by stirring at 60° C. for 1 hour. A solution of 61.1 g of sodium hydroxide in 122 g of water was added thereto while stirring at a high speed, and the mixture was stirred at 75° C. for 6 hours and then at 80° C. for 2 hours, whereupon the reaction mixture became a white slurry. After cooling, the white slurry was filtered through a glass filter to give 238.4 g of a vinylamine-vinyl alcohol copolymer. An aliquot of the polymer was analyzed to find that the residual acetic acid content and the residual formic acid content were 0.11 g and 0.015 g, respectively, per gram of the polymer. The NMR analysis revealed that both the vinyl acetate unit and the vinylformamide unit had undergone hydrolysis to a degree of 95% or more.

c) Purification of Polymer

Fifteen grams of the resulting polymer was washed with 100 g of ice-water at 3° C. on a glass filter and dried to obtain a powdered vinylamine-vinyl alcohol copolymer in a yield of 96%. As a result of ion chromatography, it was found that the polymer had an acetate ion content of 0.018 g in terms of sodium acetate and a formate ion content of 0.015 g in terms of sodium formate per gram of the polymer.

EXAMPLE 2

An aqueous dispersion of an vinylamine-vinyl alcohol copolymer obtained in the same manner as in Example 1-(a) and (b) was filtered through a glass filter and washed with 100 g of methanol to give a powdered polymer in a yield of 98%. The acetate ion content and the formate ion content of the polymer were 0.01 g (in terms of sodium acetate) and 0.001 g (in terms of sodium formate), respectively, per gram of the polymer.

Comparative Example 1

An aqueous dispersion of an vinylamine-vinyl alcohol copolymer obtained in the same manner as in Example 1-(a) and (b) was filtered through a glass filter. The polymer on the glass filter was washed with 100 g of water at 40° C., whereupon the polymer swelled to make filtration difficult. The washed filter cake was dried to give a lumpy vinylamine-vinyl alcohol copolymer. The yield was 88%.

EXAMPLE 3

Use as Dye Fixing Agent, Fastness Test to Washing

A 4 g/liter aqueous solution of the polymer obtained in Example 1 was prepared. Silk fabric dyed with a 1.0% reactive dye solution having the following formulation in a continuous manner was dipped in the aqueous polymer solution, passed through a mangle (pick-up after mangling: 70%), and heat treated at 150° C. for 90 seconds. The continuous dyeing of the silk fabric was carried out under the following conditions.

Dye Formulation (g/liter)

Reactive dye (Kayacion Red P-4BN and Kayacion Turquoise

P-NGF (both available from Nippon Kayaku Co., Ltd.)) 100

| | |
|---|---|
| Sodium alginate | 0.5 |
| Urea | 100 |
| Anhydrous sodium carbonate | 15 |
| Sodium nitrobenzenesulfonate | 5 |

Continuous Dyeing Conditions (1) Padding (2) Drying (105° C.×3 minutes)

(3) Baking (160° C.×2 minutes)

(4) Soaping (90° C.×5 minutes)

The color fastness to washing of the treated dyed fabric was tested according to JIS L-0844. That is, a piece of the dip-dyed fabric was sewn together with white cotton or silk cloth, put in a 5 g/liter soap solution at 70° C., and agitated for 10 minutes. The degree of staining of the white cotton or silk cloth after the test was rated on a 5 to 1 scale (5, 4-5, 4, 3-4, 3, 2-3, 2, 1-2, and 1) with a grey scale for assessing change in color fastness test. The higher the rate, the less the color change and fading. The results of evaluation are shown in Table 1 below.

It is seen from Table 1 that the dyed fabric treated with the polymer of the invention exhibits markedly improved color fastness to washing as compared with the untreated dyed fabric.

TABLE 1

|  | Kayacion Red P-4BN | | Kayacion Turquoise P-NGF | |
| --- | --- | --- | --- | --- |
| White cloth | cotton | silk | cotton | silk |
| Untreated dyed fabric | 1–2 | 1–2 | 1 | 1 |
| Treated Fabric | 4 | 3 | 4 | 3 |

EXAMPLE 4

Inkjet Paper Coatings

Silica gel (available from Tokuyama; average secondary particle size: 2.5 to 2.9 μm) and the polymer obtained in Example 1 which had been neutralized with 35% of hydrochloric acid were mixed at a ratio of 10:4 by weight, and the solids content was adjusted to 10%. The resulting coating composition was applied to paper for plain paper copiers (available from Fuji Xerox Co., Ltd.) with a bar coater (bar: #24) to a dry thickness of about 1 μm. The coated paper was allowed to stand in a thermostat at 23° C. and 50% RH overnight, printed on an ink jet printer EPSON PM-750C, and tested as follows. The results obtained are shown in Table 2 below.

1) Water resistance test

The printed paper was soaked in tap water for 1 minute, drained for 1 minute, and dried at 100° C. for 5 minutes. The ink retention of the printed area was observed with the naked eye to evaluate the water resistance according to the following rating criteria.

Rating Criteria for Water Resistance

A . . . No blurring nor running of ink was observed.

B . . . Slight blurring or running of ink was observed but acceptable for practical use.

C . . . Blurring or running of ink was observed.

D . . . The ink completely ran off (the same level as with plain paper).

2) Light fastness test

Paper having 2-cm squares printed solid in black, cyan, magenta or yellow was exposed to light in a xenon fadeometer supplied by Suga Shikenki at a black panel temperature of 63° C. for 120 hours, and the color change was observed with the naked eye and rated as follows.

Good . . . No color change was observed.

Poor . . . Color change was perceived with the naked eye.

TABLE 2

|  | Coated Paper | Uncoated Paper |
| --- | --- | --- |
| Water Resistance | A | C |
| Light fastness: | | |
| Black | good | good |
| Cyan | good | good |
| Magenta | poor | poor |
| Yellow | good | good |

It has now been proved that the polymer of the invention, applied onto the surface of paper, does not cause color change or fading of ink.

EXAMPLE 5

Application to Plastic Film

The polymer of Example 1 was dissolved in water to make a 10% aqueous solution and converted to its hydrochloride by addition of the same amount of hydrochloric acid. The resulting resin solution was applied to a polyethylene terephthalate (PET) film (surface resistivity: $5 \times 10^{13}$ Ω/square) with a bar coater to a dry thickness of about 1 μm and dried. The dried coating film was transparent with no precipitate of a salt, etc.

The coated PET film was allowed to stand in a thermostat at 23° C. and 50% RH for one day. The surface resistivity of the coated film was $2 \times 10^7$ Ω/square, showing improvement on antistatic properties.

When printed on an ink jet printer, the coated PET film had satisfactory printability, whereas the printed image on the uncoated PET film showed no ink fixing properties and easily rubbed out.

EXAMPLE 6 a) Synthesis of Polymer

In a 2 liter-volume 4-necked flask equipped with a stirrer, an inlet for nitrogen, and a cooling tube were put 642 g of desalted water, 4.48 g of lauryldimethylaminoacetic acid betain (ANHITOL 20BS, a surface active agent available from Kao Corp.) as a dispersion stabilizer, 4.48 g of polyethylene glycol (molecular weigh t: 20000) as a dispersion stabilizer, 1.48 g of sodium pyrophosphate as a dispersion stabilizer, 6.3 g of N-vinylformamide, 39.4 g of vinyl acetate, and 0.098 g of 2,2'-azobis (2,4-dimethylvaleronitrile) (V-65, available from Wako Pure Chemical Industries, Ltd.) as a polymerization initiator, and the mixture was heated to 65° C. while stirring. When the reaction mixture began to get white turbid, a mixture of 56.4 g of N-vinylformamide and 355.5 g of vinyl acetate and 0.88 g of a 5% alcohol solution of V-65 were added thereto dropwise over 3 hours. After stirring at 75° C. for 2 hours, 4 g of a 5% methanolic solution of N,N'-azobisisobutyronitrile and 270 g of desalted water were added thereto, followed by stirring for 3 hours. To the reaction mixture was further added 4 g of a 5% methanolic solution of N,N'-azobisisobutyronitrile, followed by stirring at 98° C. for 1 hour to give a white paste. The percent conversions of N-vinylformamide and vinyl acetate were 99.6% and 99.4%, respectively, as measured by liquid chromatography.

b) Hydrolysis

To 1050 g of the white pasty polymer composition was added 16.45 g of a 30% aqueous solution of hydroxylamine sulfate, followed by stirring at 60° C. for 2 hours. To the mixture was added 367.4 g of a 48% aqueous solution of caustic soda at 20° C. over a period of 1 hour while stirring at a high speed, and the mixture was stirred at 75° C. for 6 hours and then at 80° C. for 2 hours, whereupon the reaction mixture became a white slurry. After cooling, the white slurry was filtered through a glass filter to give a crude vinylamine-vinyl alcohol copolymer.

c) Purification of Polymer

The resulting crude copolymer was washed with 1800 g of methanol on the glass filter and dried to obtain 223 g (yield: 93%) a white powdered polymer. The NMR analysis revealed that both the vinyl acetate unit and the vinylformamide unit had undergone hydrolysis to a degree of 95% or more. The cation equivalent of the polymer was 3.47 meq/g as obtained by colloidal titration. The viscosity of a 4% aqueous solution of the polymer was 30.6 mPa.s. The ion chromatographic analysis showed that the polymer had a residual acetate ion content of 0.2% in terms of sodium acetate, with no formate ion detected.

EXAMPLE 7

Use as Hair-setting Composition

A 1% aqueous solution of the polymer prepared in Example 6 was adjusted to pH 7 with lactic acid and diluted with water to 0.5%. Human hairs weighing 1.3 g were dipped in the aqueous polymer solution to adhere 0.4 g of the polymer solution to the hair and dried. After conditioning at 60% RH overnight, the individual treated hair was placed on a 65 mm wide mount, and a bending strength was measured with a load put on the center. While the hair before the treatment had no shape retention, the treated hairs had a maximum bending strength of 159 g, proving that the polymer of Example 6 had hair-setting properties. Even after the treated hairs were rubbed together, the maximum bending strength was 98 g, showing that the setting properties remained.

The process according to the present invention provides a copolymer comprising an N-vinylamine unit and a vinyl alcohol unit in the form of powder at a low cost, offering a great industrial advantage. The water-soluble polymer obtained by the process is suitable as a component of hair-setting compositions and hair conditioning compositions. It also finds effective use as a dye fixing agent to be applied to fiber, etc. and a surface coating agent to be applied to paper or plastic films.

What is claimed is:

1. A process comprising
   hydrolyzing, in a single step, at least one amide unit and at least one acetate unit of a copolymer comprising one or more polymerized N-vinylamide units and one or more polymerized vinyl acetate units, wherein the copolymer is dispersed in water in an amount of from 10 to 45% by weight in the presence of from 0.1 to 10 equivalents of base per equivalent of monomer unit, to precipitate a powdered water-soluble polymer comprising one or more vinyl amine units in the form of a free amine and one or more vinyl alcohol units by forming one or more salts and then
   washing the powdered water-soluble polymer with at least one washing liquid selected from the group consisting of an alcohol, water at 20° C. or lower, and salt water.

2. The process according to claim 1, wherein the hydrolysis reaction mixture is once separated into liquid and solid, and the resulting copolymer powder is washed with the washing liquid.

3. The process according to claim 1, wherein said N-vinylamide unit is an N-vinylformamide unit.

4. The process according to claim 1, wherein the molar ratio of said N-vinylamide unit to said vinyl acetate unit in said copolymer is 1:99 to 50:50.

5. The process according to claim 1, wherein the hydrolysis of the copolymer is carried out in presence of a caustic alkali.

6. The process according to claim 1, wherein the degree of hydrolysis of the copolymer is 20% or more.

7. The process according to claim 1, wherein said washing liquid is a lower aliphatic alcohol.

8. The process according to claim 1, wherein the washing is carried out until the total concentration of an acetate and a formate by-produced by the hydrolysis in the water-soluble polymer is reduced to 5000 ppm or less.

9. The process according to claim 1, wherein said water-soluble polymer is precipitated from the hydrolysis reaction mixture containing 0.5 to 50% by weight of a salt.

10. The process according to claim 1, wherein said washing is effected with water at a temperature of 20° C. or lower.

11. The process according to claim 10, wherein said washing is effected with water at 10° C. or lower.

12. The process according to claim 11, wherein said washing is effected with water at a temperature of from 0 to 5° C.

* * * * *